(12) United States Patent
Gerken et al.

(10) Patent No.: US 8,215,585 B2
(45) Date of Patent: Jul. 10, 2012

(54) IMPACT RESISTANT CORE

(75) Inventors: Noel T. Gerken, Maple Valley, WA (US); Nick Patz, Benicia, CA (US)

(73) Assignee: The Boeing Company, Chicago, IL (US)

( * ) Notice: Subject to any disclaimer, the term of this patent is extended or adjusted under 35 U.S.C. 154(b) by 922 days.

(21) Appl. No.: 12/119,561

(22) Filed: May 13, 2008

(65) Prior Publication Data

US 2009/0286040 A1    Nov. 19, 2009

(51) Int. Cl.
*B64C 1/00* (2006.01)
(52) U.S. Cl. ........... 244/133; 244/121; 442/135; 89/904
(58) Field of Classification Search ................... 244/133, 244/121, 119; 442/135, 134; 89/904, 903, 89/36.02; 428/116–118
See application file for complete search history.

(56) References Cited

U.S. PATENT DOCUMENTS

| | | | |
|---|---|---|---|
| 4,049,309 A | 9/1977 | Seal | |
| 4,623,951 A * | 11/1986 | DuPont et al. ................ | 361/218 |
| 4,686,806 A | 8/1987 | Bennett | |
| 4,937,125 A | 6/1990 | Sanmartin et al. | |
| 4,957,577 A | 9/1990 | Huebner | |
| 6,114,050 A * | 9/2000 | Westre et al. ................. | 428/608 |
| 6,245,407 B1 * | 6/2001 | Wang et al. .................... | 428/116 |
| 6,440,527 B2 * | 8/2002 | Prins et al. .................... | 428/118 |
| 6,558,783 B1 | 5/2003 | Kato et al. | |
| 6,568,310 B2 * | 5/2003 | Morgan ....................... | 89/36.02 |
| 6,591,949 B2 | 7/2003 | Kitano et al. | |
| 6,620,905 B1 | 9/2003 | Musa | |
| 6,679,969 B1 * | 1/2004 | Fournier et al. ............... | 156/245 |
| 6,712,318 B2 * | 3/2004 | Gubert et al. ............... | 244/171.7 |
| 6,743,852 B2 | 6/2004 | Dershem et al. | |
| 7,125,624 B2 | 10/2006 | Tanno | |
| 7,157,509 B2 | 1/2007 | Li et al. | |
| 7,601,654 B2 * | 10/2009 | Bhatnagar et al. ............ | 442/135 |
| 7,703,375 B1 * | 4/2010 | Scott et al. .................... | 89/36.02 |
| 7,735,407 B2 * | 6/2010 | Keener et al. ................ | 89/36.02 |
| 2002/0100840 A1 | 8/2002 | Billinger et al. | |
| 2002/0179390 A1 * | 12/2002 | Kitano et al. ................. | 188/371 |
| 2007/0238379 A1 | 10/2007 | Bhatnagar et al. | |
| 2008/0032089 A1 | 2/2008 | Bauer et al. | |
| 2009/0283635 A1 | 11/2009 | Gerken et al. | |
| 2010/0258673 A1 * | 10/2010 | Garcia Laja et al. ......... | 244/121 |
| 2011/0088542 A1 | 4/2011 | Park et al. | |
| 2011/0108359 A1 * | 5/2011 | Nishimura et al. ........... | 181/290 |

OTHER PUBLICATIONS

USPTO office action dated Dec. 21, 2011 reguarding U.S. Appl. No. 12/350,941, 7 pages.
Response to Office Action dated Mar. 26, 2012 regarding U.S. Appl. No. 12/350,941, 8 pages.

* cited by examiner

*Primary Examiner* — Christopher P Ellis
(74) *Attorney, Agent, or Firm* — Yee & Associates, P.C.

(57) ABSTRACT

Impact resistant cores and methods of manufacturing such impact resistant cores are provided. Additionally, components made using the impact resistant cores are provided. A particular impact resistant core includes a composite structure of at least one non-woven sheet including poly p-phenylene-2,6-benzobisoxazole fiber and a binding resin.

9 Claims, 5 Drawing Sheets

IMPACT RESISTANT CORE

FIELD

The present disclosure is generally related to impact resistant cores.

BACKGROUND

Composite structures that include a core sandwiched between face sheets are used for many purposes. Often the core includes cells or air pockets to reduce the weight of the composite structure as compared to a similar structure made from solid materials (i.e., materials without cells or air pockets). The reduced weight of these composite structures has led the aircraft industry to use such composite structures to reduce the weight of aircraft components.

In sandwich structures the core can serve several purposes, such as providing stiffness to the structure, insulating the structure, providing thickness to the structure to achieve desired dimensional characteristics, to offset the face sheets, to support and stabilize the face sheets, etc. However, there can be trade-offs with using sandwich composite structures rather than solid materials. For example, sandwich composite structures can have reduced material performance characteristics. Additionally, such sandwich composite structures may have less than optimal resistance to damage by impact with foreign objects. Hence, when aircraft components are made using sandwich composite structures, the components may require relatively frequent inspection and replacement. Accordingly, there is a need for improved cores that provide greater impact resistance, which may enable a greater range of uses of the sandwich composite structures.

SUMMARY

Impact resistant cores, methods of manufacturing impact resistant cores and aircraft components including impact resistant cores are disclosed. In a particular embodiment, a honeycomb core structure is disclosed that includes at least one non-woven sheet including poly p-phenylene-2,6-benzobisoxazole fiber and a binding resin.

In another particular embodiment, a composite sandwich structure is disclosed that includes a stiffening element and at least one laminate face sheet coupled to the stiffening element. The stiffening element includes a plurality of non-woven poly p-phenylene-2,6-benzobisoxazole fibers and a binding resin.

In another particular embodiment, an aircraft component is disclosed. The aircraft component includes a stiffening element and at least one laminate face sheet coupled to the stiffening element. The stiffening element includes a plurality of fibers and a polybenzoxazine binding resin.

In another particular embodiment, a method of making a structural core includes wetting a plurality of poly p-phenylene-2,6-benzobisoxazole fibers with a resin. The method also includes shaping the wetted poly p-phenylene-2,6-benzobisoxazole fibers to form a corrugation and curing the resin. The method further includes bonding a plurality of the corrugations to make a honeycomb.

In another particular embodiment, a method of making a structural core includes bonding two or more fiber sheets using an adhesive. The fiber sheets include poly p-phenylene-2,6-benzobisoxazole fibers. The method also includes curing the adhesive and expanding the fiber sheets to make cells between the fiber sheets. The method further includes applying a resin to the two or more expanded fiber sheets and curing the resin.

DETAILED DESCRIPTION

The features, functions, and advantages that have been discussed can be achieved independently in various embodiments disclosed herein or may be combined in yet other embodiments further details of which can be seen with reference to the following description and drawings.

By way of introduction, in a particular embodiment, an impact resistant core can be made by shaping a plurality of fibers into a desired configuration (such as a honeycomb structure) and binding the fibers together using a resin. Impact resistant cores made in this manner can be used as stiffening elements in sandwich composite structures to make parts that are lightweight and durable. For example, the impact resistant cores can be used to make various aircraft components. The sandwich composite structures can include one or more laminate face sheets coupled to the core. When the impact resistant core is to be used to make aircraft components, the resin and the fibers may be selected to reduce thermal expansion, to provide sufficient strength and stiffness to the aircraft component, to reduce moisture absorption, and to meet aircraft component smoke and toxicity requirements.

In a particular embodiment, an impact resistant core can be made using non-woven poly p-phenylene-2,6-benzobisoxazole (PBO) fibers. For example, the non-woven PBO fibers can include a mat of chopped PBO fibers arranged in a random or unstructured manner. In another example, the non-woven PBO fibers can be bound by a plurality of fibrids (expanded fibers) in a PBO paper. The fibrids can include PBO fibrids, poly m-phenylene isophthalamide (NOMEX™) fibrids, poly paraphenylene terephthalamide (KEVLAR™) fibrids, or fibrids made from other polymer fibers.

In a particular embodiment, the fibers can be bound using a polybenzoxazine (BXA) resin. Other resins can also be used, such as phenolic resins. The resin can be applied to the fibers by dipping the fibers in the resin, by painting or spraying the resin onto the fibers, using other application techniques, or any combination thereof. Additionally, the resin can be applied to the fibers before the fibers are shaped in the desired configuration (e.g., by pre-impregnating fiber sheets with the resin) or after the fibers have been shaped into a desired configuration (e.g., by dipping or spraying the shaped fibers).

Figure 1:
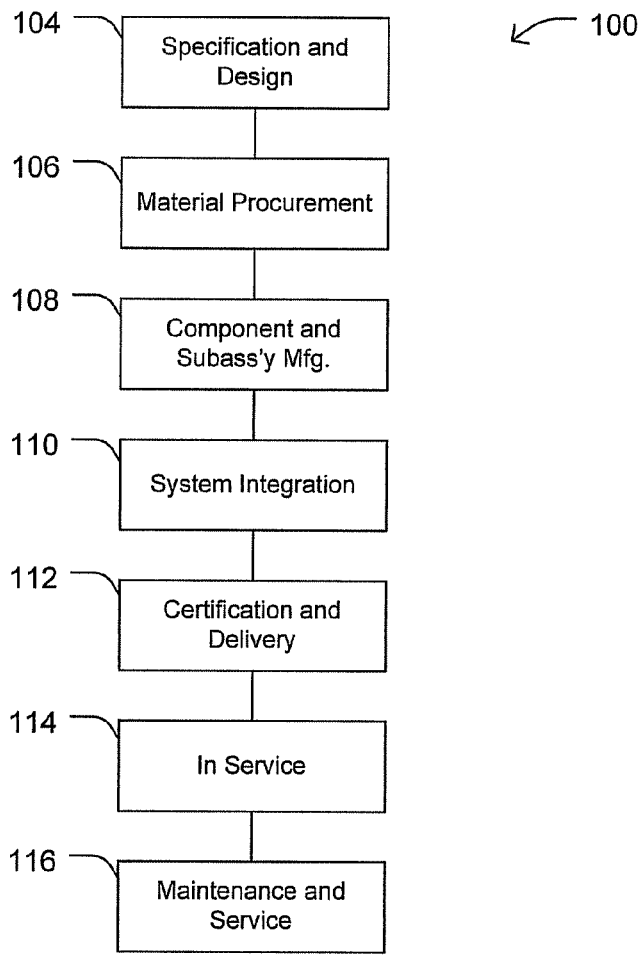
FIG. 1 is a flow diagram of an aircraft production and service methodology.
Figure 2:
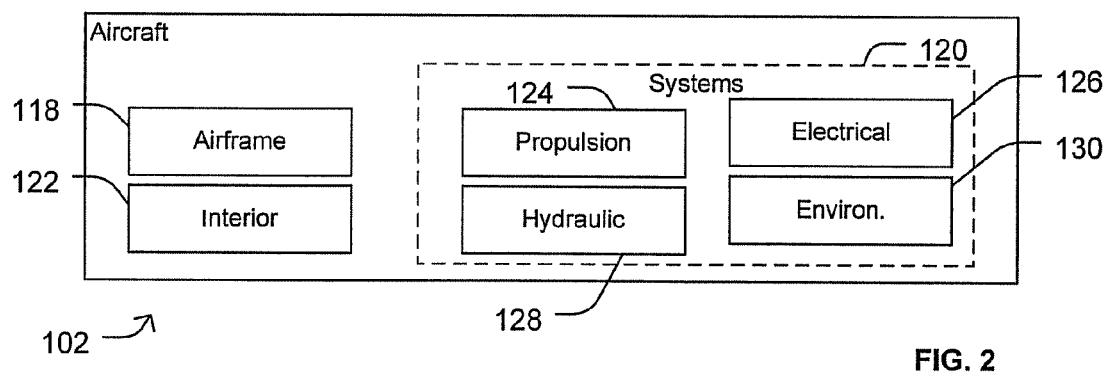
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; arid an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the various embodiments may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
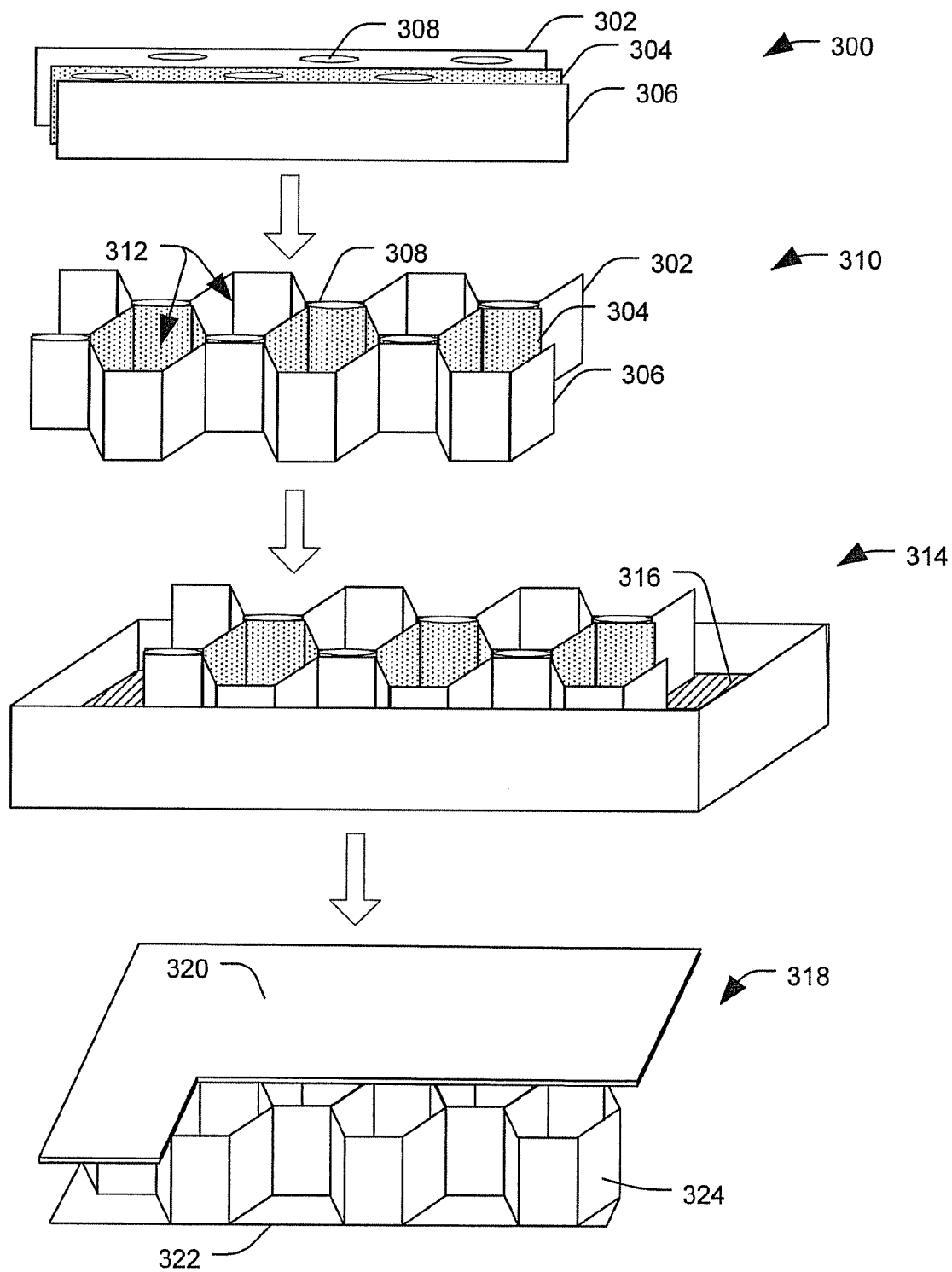
FIG. 3 is an illustration of a first particular embodiment of a method of manufacturing impact resistant core.

FIG. 3 illustrates a first particular embodiment of a method of manufacturing an impact resistant core. The impact resistant core 324 may include a plurality of non-woven fiber sheets 302, 304, 306 and a binding resin 316. In a particular embodiment, the binding resin 316 includes a polybenzoxazine (BXA) resin, a phenolic resin, another polymer resin, or any combination thereof. In a particular embodiment, at least one of the non-woven fiber sheets 302, 304, 306 includes multiple poly p-phenylene-2,6-benzobisoxazole (PBO) fibers. For example, the non-woven fiber sheets 302, 304, 306 can include mats of chopped PBO fibers in a random or unstructured orientation. In another example, the non-woven fiber sheets 302, 304, 306 can include a paper including PBO fibers bound with fibrids (expanded fibers), such as expanded PBO fibers, expanded NOMEX™ fibers, expanded KEVLAR™ fibers, other expanded polymer fibers, or any combination thereof. Both mats and papers are referred to generally herein as sheets.

At 300, an adhesive 308 has been applied to the non-woven fiber sheets 302, 304, 306 to bind the non-woven fiber sheets 302, 304, 306 together. After the adhesive 308 is cured, the non-woven fiber sheets 302, 304, 306 can be pulled away or expanded from each other, at 310, to make cells 312. The shape and size of the cells 312 is dependent upon where the adhesive 308 is applied to the non-woven fiber sheets 302, 304, 306. The shape and size of the cells 312 may also be dependent upon other process characteristics, such as, how far apart the non-woven fiber sheets 302, 304, 306 are pulled. In the particular embodiment illustrated in FIG. 3, the cells 312 are substantially hexagonal; however, in other embodiments, the cells 312 can be substantially rectangular, irregular or any other shape according to the design of the particular core.

After the cells 312 are made, the binding resin 316 can be applied to the non-woven fiber sheets 302, 304, 306. For example, at 314, the non-woven fiber sheets 302, 304, 306 can be submerged in the binding resin 316 (e.g., by dipping the non-woven fiber sheets 302, 304, 306 in the binding resin 316, by dispensing the binding resin 316 to cover the non-woven fiber sheets 302, 304, 306, and so forth). In other embodiments, the binding resin 316 can be applied to the non-woven fiber sheets 302, 304, 306 by spraying, painting, any other application process, or any combination thereof.

After the binding resin 316 is cured, the completed impact resistant core 324 can be used in a sandwich structure, at 318, by coupling one or more laminating face sheets 320, 322 to the impact resistant core 324. The sandwich structure can be used for a variety of purposes, such as to make aircraft components.

Figure 4:
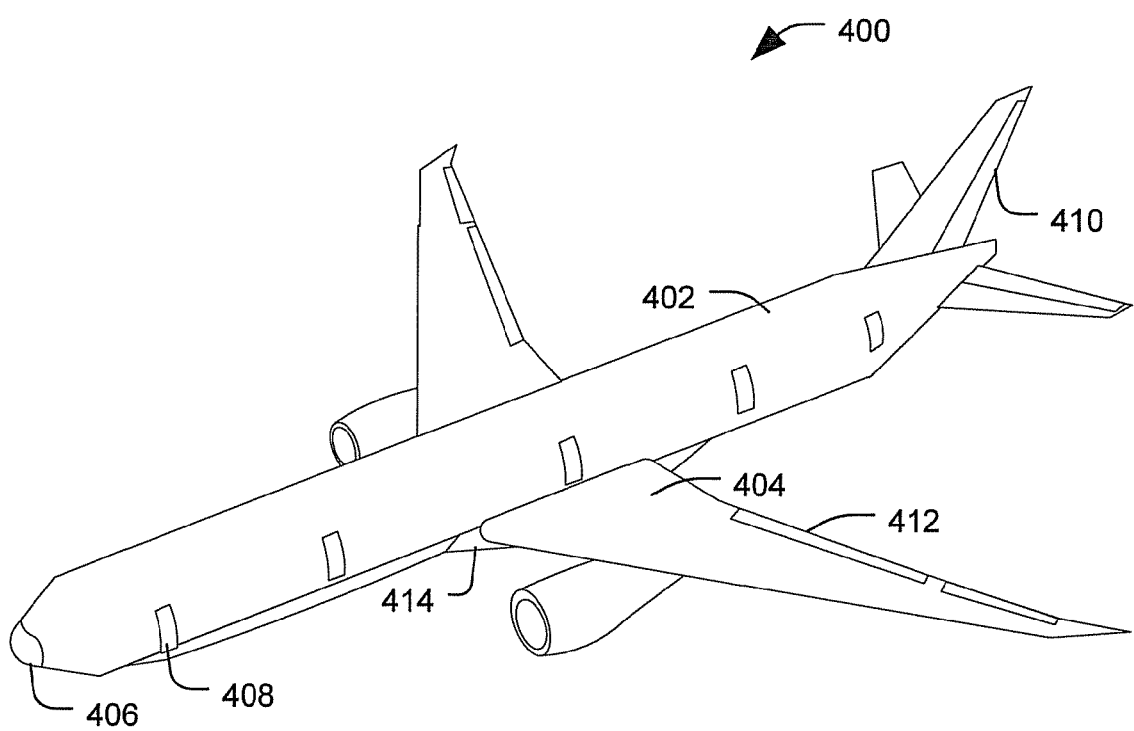
FIG. 4 is an illustration of a particular embodiment of an aircraft including one or more components made using an impact resistant core.

FIG. 4 depicts a particular embodiment of an aircraft 400 including one or more components made using the impact resistant core 324 illustrated in FIG. 3. The aircraft 400 includes a plurality of primary structural members and a plurality of secondary structure members. The primary structural members include load-bearing components, such as, without limitation, a fuselage 402 and wings 404. The secondary structure members include, without limitation, non-load-bearing components, such as radomes 406, doors 408, control surfaces, such as horizontal control surfaces 412 (e.g., slats, flaps, ailerons, elevators, air brakes, etc.) and vertical control surfaces 410 (e.g., rudders), and fairings 414. The secondary structural members can also include a large number of other members such as aircraft engine cowls, and service access panels, as well as interior components, such as bulkheads, interior doors, interior cabinets, flooring, and so forth.

An aircraft component, such as one of the primary structural members or one of the secondary structural members, may include at least one laminate face sheet and at least one stiffening element. In a particular embodiment, the at least one stiffening element includes a plurality of fibers and a BXA binding resin. The plurality of fibers may include one or more sheets of non-woven PBO, such as PBO mats or PBO paper. In another particular embodiment, the at least one stiffening element includes a plurality of non-woven PBO fibers and a binding resin. The plurality of non-woven PBO fibers may be randomly oriented or oriented in an unstructured manner. Additionally, the stiffening element may include a plurality of fibrids binding the non-woven PBO fibers. The fibrids may include expanded PBO fibers, or expanded fibers of another polymer such as NOMEX™ or KEVLAR™. The binding resin can include BXA, a phenolic resin, or another polymer resin. In an illustrative embodiment, the laminate face sheet may be the laminate face sheet 320 or 322 of FIG. 3, and the at least one stiffening element may be the impact resistant core 324 of FIG. 3.

In a particular embodiment, aircraft structural members, such as interior members, may be subject to various fire safety standards, such as smoke and toxicity requirements, in order to be deemed airworthy. Impact resistant cores made in accordance with various embodiments using PBO fibers and BXA binding resin may comply with current fire safety standards, such as smoke and toxicity burn characteristics. Additionally, such PBO fiber and BXA binding resin impact resistant cores have relatively good moisture absorption and thermal capabilities relative to cores made using fiberglass, NOMEX™ and KEVLAR™.

Figure 5:
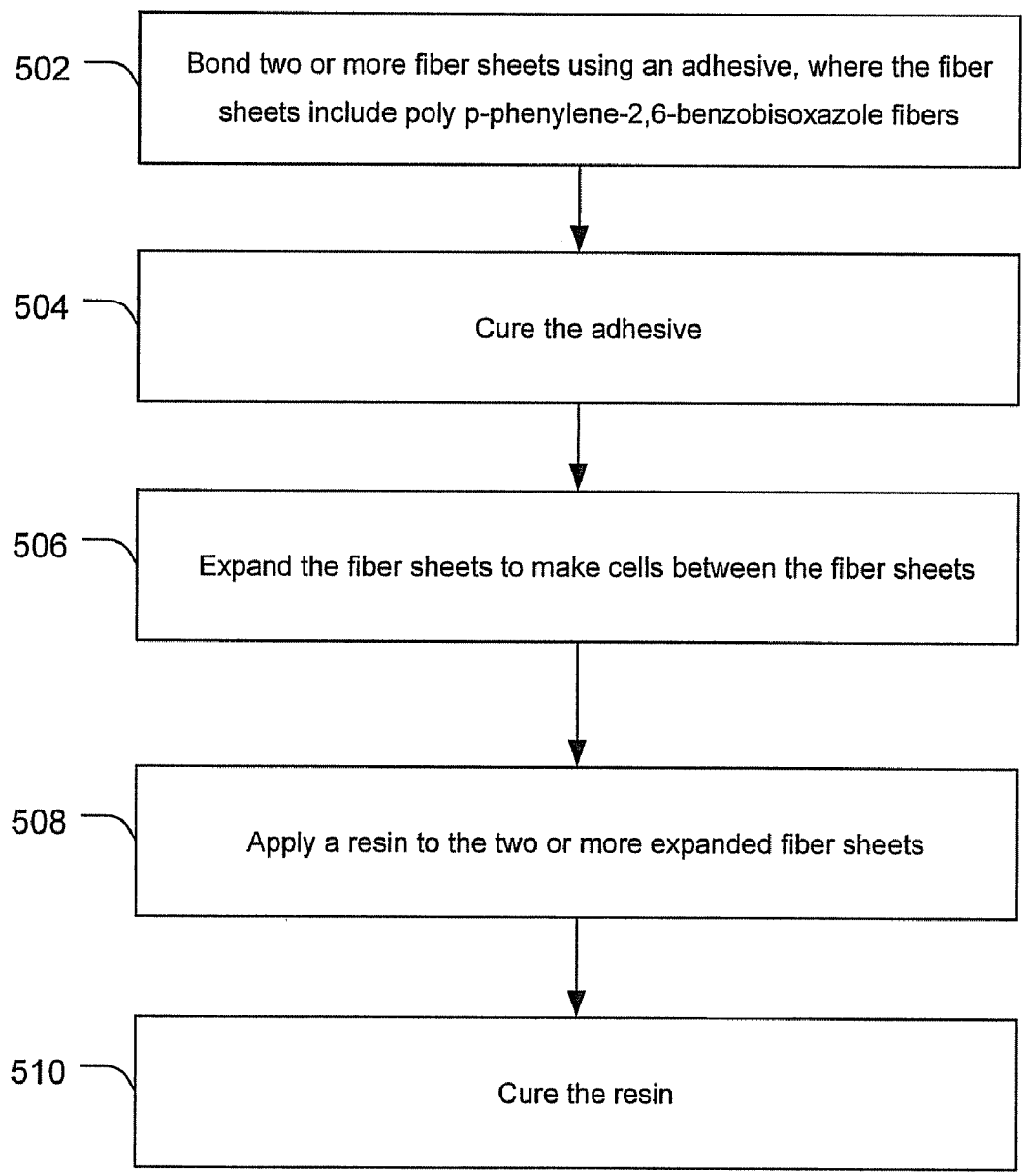
FIG. 5 is an illustration of operations performed in the first particular embodiment of a method of making an impact resistant core.

FIG. 5 depicts a first particular embodiment of a method of making an impact resistant core. In a particular embodiment, the method depicted in FIG. 5 can be used to make a honeycomb core, such as impact resistant core 324 depicted in FIG. 3.

The method includes, at 502, bonding two or more fiber sheets using an adhesive. The fiber sheets include poly p-phenylene-2,6-benzobisoxazole (PBO) fibers. The method also includes, at 504, curing the adhesive. In a particular embodiment, the adhesive can include an epoxy adhesive. In another particular embodiment, the adhesive can include a polybenzoxazine (BXA) adhesive. The adhesive may be applied to the two or more fiber sheets in stripes such that when the adhesive has cured the fiber sheets can be expanded (e.g., by pulling the sheets away from one another), at 506, to make cells between the fiber sheets.

The method also includes, at 508, applying a resin to the two or more expanded fiber sheets. For example, the resin can be sprayed on the fiber sheets, the expanded fiber sheets can be dipped into the resin, or any other application process or combination thereof can be used to apply the resin to the two or more expanded fiber sheets. The method also includes, at 510, curing the resin. In a particular embodiment, the resin includes a BXA resin, a phenolic resin, or any other polymer resin suitable for the particular use for which the impact resistant core will be employed. For example, where the impact resistant core will be used to make an aircraft component, the resin may be selected base on burn characteristics, water absorption characteristics, thermal expansion characteristics, other material characteristics of the resin related to airworthiness, or any combination thereof. Both BXA resin and phenolic resin are believed to be suitable to make impact resistant cores for aircraft components.

Figure 6:
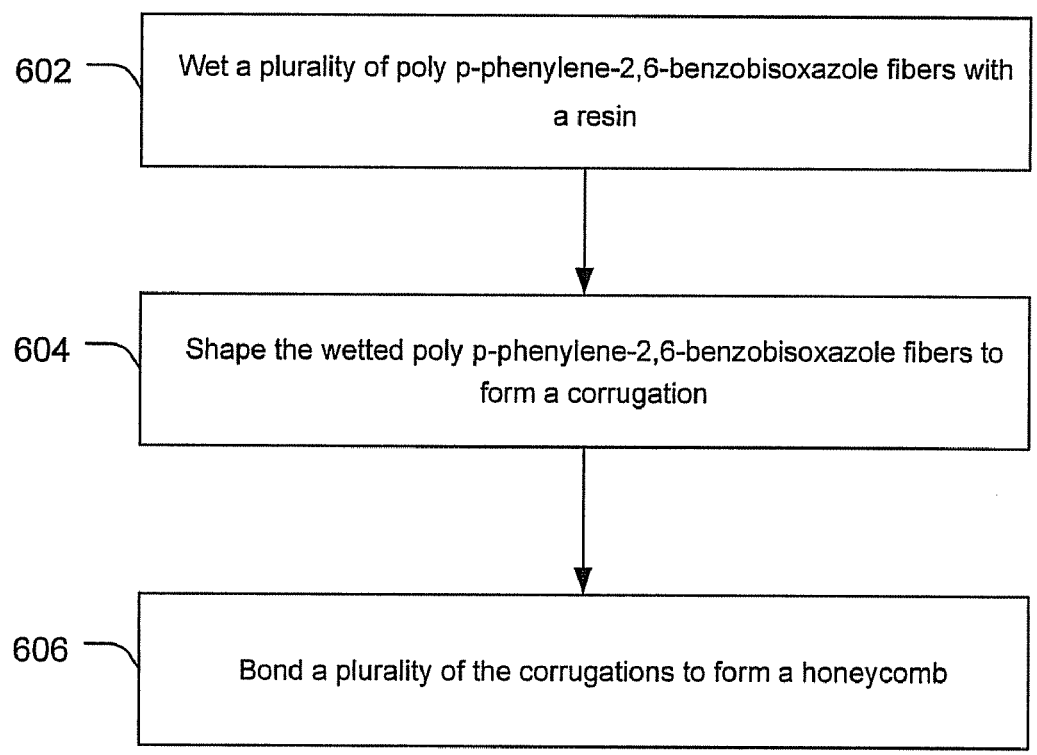
FIG. 6 is an illustration of operations performed in a second particular embodiment of a method of making an impact resistant core.

FIG. 6 depicts a second particular embodiment of a method of making an impact resistant core. In a particular embodiment, the method depicted in FIG. 6 can be used to make a honeycomb core, such as impact resistant core 324 depicted in FIG. 3.

The method includes, at 602, wetting a plurality of poly p-phenylene-2,6-benzobisoxazole (PBO) fibers with a resin. For example, the PBO fibers can be pre-impregnated with the resin. In another example, the PBO fibers can be coated in the resin (e.g., by dipping, submerging, spaying, painting, or otherwise applying the resin to the PBO fibers). In a particular embodiment, the PBO fibers may have a random or unstructured orientation with respect to one another. For example, the PBO fibers can include sheets of the PBO fibers, such as PBO fiber mat, PBO fiber paper, or any other non-woven sheet of PBO fibers.

The method also includes, at 604, shaping the wetted PBO fibers to form a corrugation. For example, the wetted PBO fibers may be applied to a tool or mandrel that has a desired shape of the corrugation and the resin may be cured. In another example, the PBO fibers can be folded to the shape of the corrugation.

The method also includes, at 606, bonding a plurality of corrugations together to make a core. For example, the corrugations can be bonded to make a honeycomb structure, such as the impact resistant core 324 of FIG. 3. The honeycomb structure may include a plurality of cells with each cell having a cross sectional shape and size that is selected based upon an intended end use of the honeycomb and fabrication techniques used to make the honeycomb. For example, the honeycomb cells may be substantially hexagonal, rectangular, triangular, circular, or any other suitable shape.

In particular embodiments, the impact resistant cores and composite structures made using those cores that are disclosed herein may have particular advantage when used to make aircraft components. For example, sandwich composites structures made using PBO fiber and BXA resin cores have relatively high impact resistance. As a result of the improved impact resistance, aircraft components made using such cores may be damaged less frequently or less severely requiring significantly less inspection and replacement than traditional skin and stringer structures or honeycomb structures made using fiberglass, NOMEX™ or KEVLAR™. Additionally, the PBO fiber and BXA resin cores have other characteristics that may be beneficial for aircraft components, such as improved strength and stiffness. Further, the PBO fiber and BXA resin cores have suitable thermal capabilities, moisture adsorption and burn characteristics (e.g., fire resistance and smoke toxicity) for use in aircraft components.

Tests of mechanical properties of the PBO fiber and BXA resin cores according to disclosed embodiments have been performed with representative results summarized in Table 1. The tests showed unexpected improvements in impact resistance for the PBO fiber and BXA resin cores relative to NOMEX™, KEVLAR™ and fiberglass fibers based cores made with phenolic resins. For the tests, each core was faced with a face sheet including a laminate skin using 7-ply Toray P2352W19 unidirectional carbon tape/epoxy (available from Toray Composites of Tacoma Wash.) in quasi-isotropic orientation and 1-ply of Cytec Metlbond 1515-3M-.03 PSF film adhesive (available from Cytec Engineered Materials of Anaheim, Calif.). Each tested core was approximate 1-inch thick and had a honeycomb configuration (i.e., substantially hexagonal cells). An impact resistance of each sandwich structure was tested for barely visible impact damage (BVID) which was determined as 0.04 inch damage dent depth.

TABLE 1

| Item # | Resin | Fiber | Cell Geometry | BVID impact energy (in-lb) |
| --- | --- | --- | --- | --- |
| 1 | Phenolic | KEVLAR™ | ⅛" hexagon | 175 |
| 2 | Phenolic | NOMEX™ | ⅛" hexagon | 150 |
| 3 | Phenolic | Fiberglass | 3/16" hexagon | 150 |
| 4 | BXA | PBO fabric | 3/16" hexagon | 300 |
| 5 | BXA | PBO mat | 0.14" hexagon | 425 |

The observed BVID impact damage energy for a KEVLAR™ based core with phenolic resin, such as item #1 in Table 1, was 175 inch pounds (in-lb). The observed BVID impact damage energy for a NOMEX™ based core with phenolic resin, such as item #2 in Table 1, was 150 inch pounds. The observed BVID impact damage energy for a fiberglass based core with phenolic resin, such as item #3 in Table 1, was 150 inch pounds. Testing showed that the BVID impact energy for the PBO fabric (that is woven PBO fibers) and BXA resin core, such as item #4 in Table 1, was approximately 300 inch pounds. However, the BVID impact energy for unwoven PBO fiber (specifically, PBO mat) and BXA resin core, such as item #5 in Table 1, was 425 inch pounds.

The data summarized in Table 1 are for general comparison purposes and are not intended as limiting. The data indicate generally that cores made with PBO fibers and BXA resin can have impact energies greater than 200 inch pounds. For example, cores made with PBO fabrics and BXA resin can have BVID impact energies greater than 300 inch pounds, and cores made with non-woven PBO fibers and BXA resin can have BVID impact energies greater than 400 inch pounds.

In addition to the advantages illustrated in Table 1, where sandwich structures made using the disclosed PBO fibers, BXA resin, or both, are used to replace skin and stringer for primary structural members in aircraft, there may be significant weight reduction due to the reduced weight of the sandwich structures relative to the skin and stringer structures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, the claimed subject matter may be include less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present claimed subject matter is to be determined by the broadest permissible interpretation of the following claims and their equivalents, and shall not be restricted or limited by the foregoing detailed description.

What is claimed is:

1. A method of making a structural core, the method comprising:
    wetting a plurality of randomly oriented fibers with a resin;
    shaping the wetted fibers to form a corrugation;
    curing the resin; and
    bonding a plurality of the corrugations to make a honeycomb structural core.

2. The method of claim 1, wherein the resin comprises polybenzoxazine.

3. The method of claim 1, wherein the resin comprises phenolic resin.

4. A method of making a structural core, the method comprising:
    bonding two or more fiber sheets using an adhesive, wherein the fiber sheets comprise randomly oriented fibers;
    curing the adhesive;
    expanding the fiber sheets to make cells between the fiber sheets;
    applying a resin to the two or more expanded fiber sheets; and
    curing the resin to form a honeycomb structural core.

5. The method of claim 4, wherein the resin comprises polybenzoxazine.

6. The method of claim 4, wherein the resin comprises phenolic resin.

7. The method of claim 4, wherein the two or more fiber sheets comprise non-woven poly p-phenylene-2,6-benzobisoxazole fibers.

8. The method of claim 4, wherein the adhesive comprises polybenzoxazine.

9. The method of claim 4, wherein the adhesive comprises an epoxy adhesive.

* * * * *